(No Model.) 2 Sheets—Sheet 1.
M. HOFBAUER.
MEAT CUTTER.
No. 441,664. Patented Dec. 2, 1890.
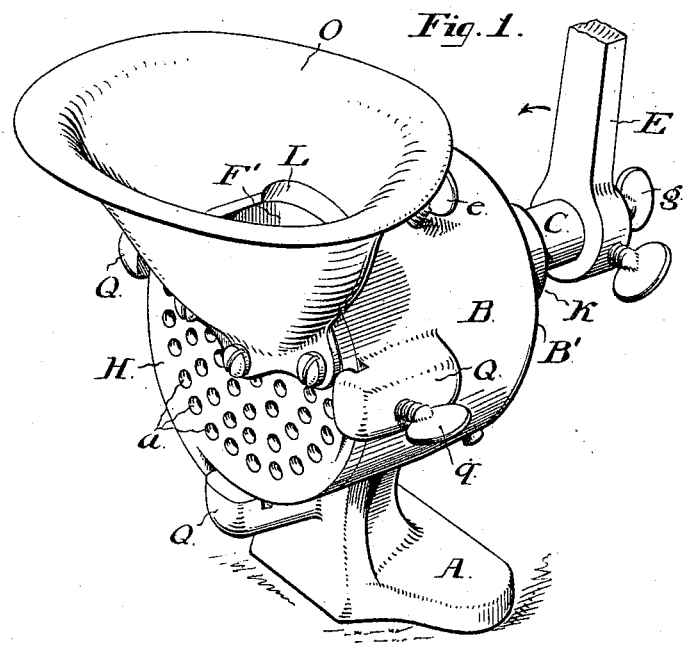
Fig. 1.
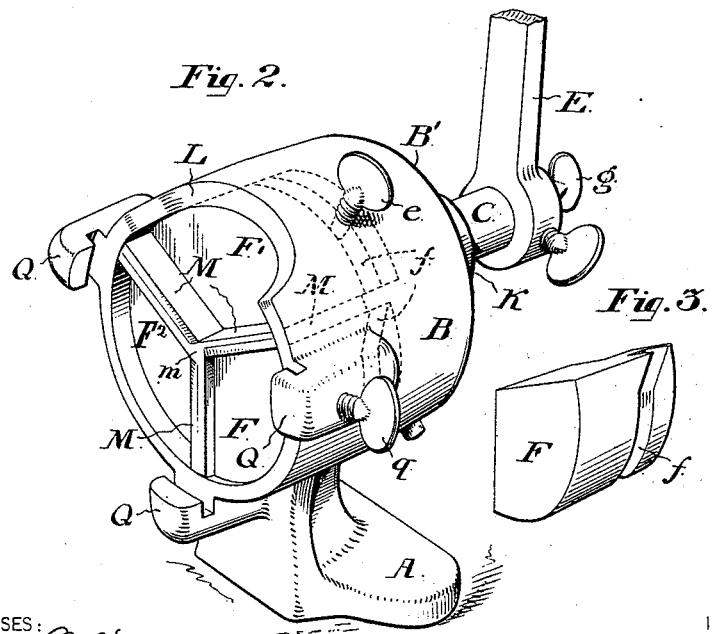
Fig. 2.
Fig. 3.
WITNESSES:
James H. Bell
E. Reese
INVENTOR:
Michael Hofbauer
BY Hollingsworth & Haley
ATTORNEYS.

(No Model.) 2 Sheets—Sheet 2.

M. HOFBAUER.
MEAT CUTTER.

No. 441,664. Patented Dec. 2, 1890.

WITNESSES:
James H. Bell
E. Reese

INVENTOR:
Michael Hofbauer
BY Hollingsworth & Haley
ATTORNEYS

UNITED STATES PATENT OFFICE.

MICHAEL HOFBAUER, OF PHILADELPHIA, PENNSYLVANIA.

MEAT-CUTTER.

SPECIFICATION forming part of Letters Patent No. 441,664, dated December 2, 1890.

Application filed November 2, 1889. Serial No. 329,030. (No model.)

*To all whom it may concern:*

Be it known that I, MICHAEL HOFBAUER, of Philadelphia, in the State of Pennsylvania, have invented certain new and useful Improvements in Meat-Cutters, whereof the following is a specification, reference being had to the accompanying drawings.

My present invention embraces certain improvements upon the meat-cutter for which an application for Letters Patent was filed by me on May 29, 1889, being Serial No. 312,645, and belongs to that class of cutters in which the meat is cut by being forced against a perforated plate.

Figure 5:
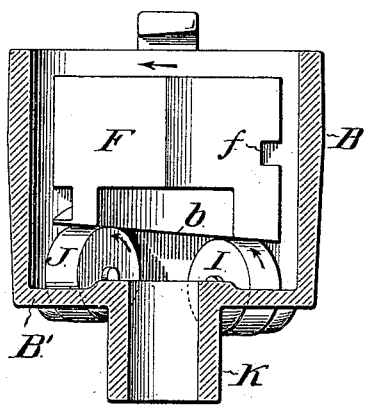
Figure 4:
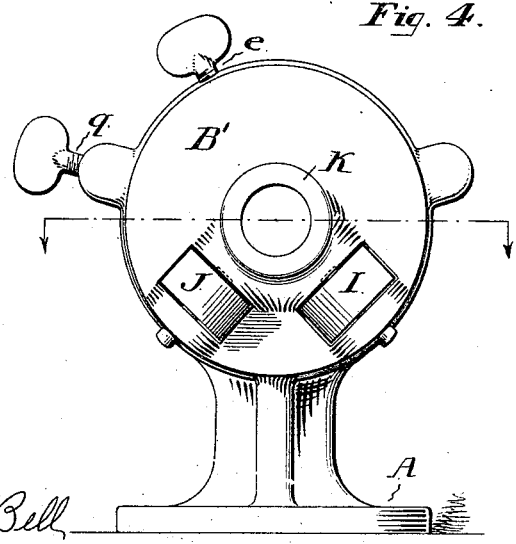

In the accompanying drawings, Figure 1 represents an exterior view of the machine in perspective. Fig. 2 is a similar view thereof with the perforated plate and the hopper for introducing the meat removed. Fig. 3 is a detail view of one of the followers by which the meat is pressed against the perforated plate. Fig. 4 is a rear view of the casing. Fig. 5 is a central longitudinal section through the casing, showing one of the followers in position; and Fig. 6 is a view in perspective of the rotating shaft of the machine and the frame in which the followers are seated.

On a suitable base A is mounted a horizontal cylindrical casing B, whose rear end is closed, as shown at B', and is provided with a central hub K, which forms the bearing for the rotating shaft C. The perforated plate H, provided with holes $a$, is secured at the front end of said casing by means of the lugs Q or in any other desired manner. The upper part of the casing at said front end and an adjacent portion of the plate H are cut away, as shown at L, to receive the hopper O, which is preferably screwed fast to the plate H.

The shaft C is provided with a winch E at its outer end, and has at its inner end a cylindrical enlargement or seat D, in which the radial slots $d$ are formed. These slots $d$ are of such size and configuration as to receive and seat the adjacent end of a carrier-frame, consisting, preferably, of three radial plates M, (see Fig. 6,) whose radial length is such that they fit snugly but move freely within the interior of the casing, and whose depth is such that their front ends are in contact with the inner side of the perforated plate H.

Figure 6:
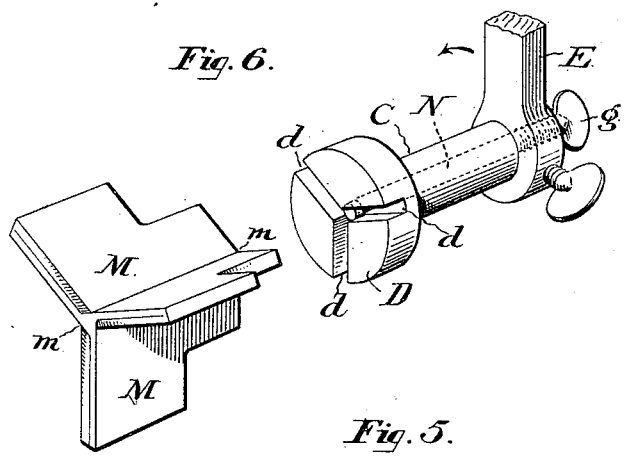

By reference to Fig. 6 it will be seen that the shaft C is axially perforated, so as to receive a longitudinal rod N, whose inner end bears against the adjacent central portion of the carrier-frame at $m$, and whose outer end is provided with the screw $g$, by which it may be shifted longitudinally, so as to throw the carrier-frame toward the perforated plate H. This arrangement I find very desirable, as the front end of the carrier-frame by rotating in close contact with the perforated plate soon becomes worn and loses its efficiency, unless some such compensating mechanism is provided.

The followers F F' F² are segmental in form, as shown in Fig. 3, fitting snugly between the radial plates of the carrier-frame and against the inner periphery of the casing A. Each of said followers has its rear end (or that which is farther from the plate) inclined, as shown at $b$, Fig. 5, and the inclined surface is arranged to ride upon the friction-rollers I J, journaled at the rear end of the casing and projecting through the same, as shown in the rear view of Fig. 4. Each of said followers is also provided with a cam-slot $f$, in which the screw-stud $e$, mounted in a casing, engages, and the incline of said cam-slot is in an opposite direction to the inclined surface upon the rear end of the follower. When the followers F F' F² are in position in their respective seats in the carrier-frame, rotation of the shaft in the direction of the arrow in Fig. 1 will cause the inclined surface $b$ upon each follower as it reaches the friction-rollers to ride up thereon, so that the follower is forced forward or toward the perforated plate. By reference to the rear view of Fig. 4 it will be seen that this occurs at or near the bottom of the casing, and when, by continued rotation, the said stud $e$ engages in the slot $f$ of a follower said follower will be near the top of the casing. The operation of the stud is of course to retract the follower away from the perforated plate, which action, as shown in Fig. 2, occurs at or near the top of the casing and when the follower is opposite to the opening of the hopper O. These movements are of course repeated on the followers as the same come respectively in contact with the rollers I J and the stud $e$, so that during the rotation of the machine the followers are successively retracted to admit the introduction of meat from the hopper and gradually forced up into contact with said perforated plate during their rotation. The front edges of the radial plates, which constitute the carrier-frame, co-operate with the inner edges of the perforations in the plate H, so as to shear or cut off the meat as the rotation progresses.

By reference to the foregoing description it will be seen that, with the exception of the very small portion opposite to the central axis $m$ of the frame, the cutting action occurs over the whole surface of the plate H, and thus no meat can escape and substantially no unequal wear can occur upon the plate itself. Furthermore, as the strain upon the actuating device for the followers is only felt when they are moving forward to force the meat against the plate, the arrangement of the rollers I and J, bearing directly against the inner ends of the followers themselves during this movement, enables me to accomplish the result with the least amount of friction and by a direct thrust. Movement of the followers in the opposite direction being of course unattended with any strain is readily accomplished by means of the cam-slot $f$ and screw-stud $e$. It will thus be seen that although the above-described machine operates upon the same principle as that specified in my said application, Serial No. 312,645, the form of the head or frame in which the followers are seated is considerably modified, and that such modification permits me to obtain some of the benefits above described.

I have in the foregoing specification specified three radial plates as the preferred form for the carrier-frame; but it must be understood that I do not limit my claims to the use of any particular number of such plates, nor is it necessary that they should be truly radial, since the chief advantage of the present arrangement lies in the fact that the operative edge of each plate and the operative front surface of the follower extend out as far as the inner periphery of the casing, whereas in my former machine the entire periphery of the followers was included within the head and did not come in contact with the casing, so that all that part of the head which was exterior to the followers and a corresponding part of the perforated plate were inoperative for cutting purposes.

Having thus described my invention, I claim—

1. The combination, with the perforated plate and a casing provided with an opening for the introduction of meat, of the rotating carrier-frame, the followers seated in said frame and having their outer surfaces in contact with the inner surface of the casing, and actuating mechanism, substantially as described, whereby said followers are alternately moved toward said plate and retracted therefrom, substantially as set forth.

2. The combination, with the perforated plate and the casing, of a rotating carrier-frame, a follower supported therein and having an incline upon its rear end, and a roller arranged within the range of rotation of said incline, substantially as set forth.

3. The combination, with the perforated plate and the casing, of a rotating carrier-frame, a follower supported therein, said follower having an incline upon its rear end and an oppositely-inclined cam-slot in its periphery, a roller arranged within the range of rotation of said incline, and a stud arranged within the range of rotation of said cam-slot, substantially as set forth.

4. The combination, with the perforated plate and the rotating shaft, of a carrier freely connected with said shaft, a follower supported by the carrier, and adjusting mechanism, substantially as set forth, whereby the carrier may be moved into proper contact with the plate.

5. The combination, with the perforated plate and the casing, of a rotating carrier-frame consisting of radial plates whose outer edges fit snugly within the casing and whose front ends fit closely against said perforated plate, the segmental followers arranged between said radial plates, said followers having their outer periphery in contact with the inner surface of the casing, and having inclined ends and oppositely-inclined cam-slots, and the rollers and the stud arranged, respectively, to co-operate with said inclines and said cam-slots to alternately throw the followers forward and backward as the carrier-frame rotates, substantially as set forth.

6. The combination, with the rotating shaft, of the seat D, having radial slots, the carrier-frame, whose ends fit freely in said slots, followers supported by the carrier-frame, and the axial rod N, having a set-screw at its outer end, the inner end of said rod bearing against the inner axis of the carrier-frame, substantially as set forth.

MICHAEL HOFBAUER.

Witnesses:
HENRY N. PAUL, Jr.,
E. REESE.